United States Patent [19]

Bhide et al.

[11] Patent Number: 5,440,727
[45] Date of Patent: Aug. 8, 1995

[54] ASYNCHRONOUS REPLICA MANAGEMENT IN SHARED NOTHING ARCHITECTURES

[75] Inventors: Anupam K. Bhide, Stamford, Conn.; George P. Copeland, Austin, Tex.; Ambuj Goyal, Amawalk, N.Y.; Hui-I Hsiao; Anant D. Jhingran, both of Yorktown Heights, N.Y.; Chandrasekaran Mohan, San Jose, Calif.

[73] Assignee: International Business Machines Corporation, Armonk, N.Y.

[21] Appl. No.: 276,130

[22] Filed: Jul. 15, 1994

Related U.S. Application Data

[63] Continuation of Ser. No. 809,354, Dec. 18, 1991, abandoned.

[51] Int. Cl.6 .......... G06F 11/00; G06F 15/00
[52] U.S. Cl. .................. 395/444; 395/600; 395/486; 395/468; 395/182.06
[58] Field of Search .......... 395/575, 600; 371/11.3, 371/11.1, 12

[56] References Cited

U.S. PATENT DOCUMENTS

| | | | |
|---|---|---|---|
| 4,432,057 | 2/1984 | Daniell et al. | 364/300 |
| 4,507,751 | 3/1985 | Gawlick et al. | 364/900 |
| 4,819,156 | 4/1989 | DeLorme et al. | 364/200 |
| 4,819,159 | 4/1989 | Shipley et al. | 364/200 |
| 5,043,866 | 8/1991 | Myre, Jr. et al. | 364/200 |
| 5,084,816 | 1/1992 | Boese et al. | 395/575 |
| 5,155,845 | 10/1992 | Beal et al. | 345/575 |
| 5,193,162 | 3/1993 | Bordsen et al. | 395/425 |

OTHER PUBLICATIONS

Hvasshovd et al "Critical Issues in the Design of a Fault-Tolerant Multiprocessor Database Server" 1991 IEEE pp. 226-231.

Rahm "Recovery Concepts for Data Sharing Systems" 1991 IEEE pp. 368-375.

King et al "Overview of Disaster Recovery for Transaction Processing Systems" 1990 IEEE pp. 286-293.

Dewitt et al "The Gamma Database Machine Project" IEEE Trans. on Knowledge and Data Eng. vol. 2 No. 1 Mar. 1990.

Lyon "Design Considerations in Replication Database Systems for Disaster Protected" 1988 IEEE pp. 428-430.

Hsiao et al "A Performance Study of Three High Availability Data Replication Stategies" IEEE 1991 @ Proc. of the 1st International Conf. on Parallel and Distributed Info. Systems 4-6 Dec. 1991 pp. 18-28.

Hvasshovd et al "Critical Issues in the Design of a Fault-Tolerant Multiprocessor Database Server" IEEE Proc. of the 1st Int. Conf. on Parallel & Distributed Info. Systems 4-6 Dec. 1991 pp. 226-231.

Primary Examiner—Robert W. Beausoliel, Jr.
Assistant Examiner—Joseph E. Palys
Attorney, Agent, or Firm—Ronald L. Drumheller

[57] ABSTRACT

In a partitioned database system of the Shared Nothing type, one or more secondary replicas of each partition are maintained by spooling (i.e., asynchronously sending) modified (usually called dirty) pages from the primary replica to the secondary replica(s) rather than by using a synchronous page update or by sending log entries instead of entire pages. A Write-Ahead Log protocol is used so that a dirty page is not forced to non-volatile storage until a log record of the modification is created and written to non-volatile storage. Replica updating does not delay the committing of transactions because replica updating is done asynchronously with respect to transaction processing. Since dirty pages are sent rather than only log entries, disk accesses and processing at the secondary replica(s) arising from the maintaining of the replicas are minimized as well. Only one centrally accessible log is maintained for all replicas of the same partition.

21 Claims, 3 Drawing Sheets

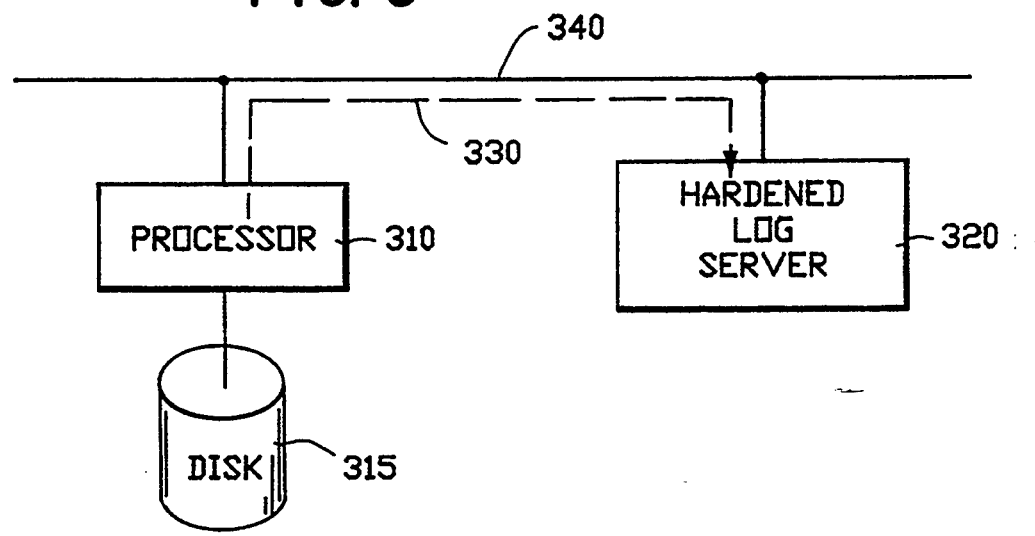

FIG. 6

| DPTR1 | |
|---|---|
| PAGEID | RECLSN |
| ⋮ | ⋮ |

640 →

| DPTR2 | |
|---|---|
| PAGEID | RECLSN |
| ⋮ | ⋮ |

| | R1 (720) | R2 (730) | STATE R1 (740) | STATE R2 (750) | P (760) |
|---|---|---|---|---|---|
| PARTITION 1 | • | • | • | • | • |
| PARTITION 2 | • | • | • | • | • |
| ⋮ | ⋮ | ⋮ | ⋮ | ⋮ | ⋮ |
| PARTITION n | • | • | • | • | • |

ASYNCHRONOUS REPLICA MANAGEMENT IN SHARED NOTHING ARCHITECTURES

This is a continuation of application Ser. No. 07/809,354 filed Dec. 18, 1991 now abandoned.

FIELD OF THE INVENTION

This invention relates to multiple processor Shared Nothing transaction processing computer systems which use a Write-Ahead Log protocol and more particularly to such systems in which two or more copies (usually called replicas) of the same information are maintained by separate processors in order to provide failure safety and high availability.

BACKGROUND OF THE INVENTION

FIG. 1 shows a typical Shared Nothing computer system architecture in the form of a database. In a database of such an architectures, the database information is partitioned over loosely coupled multiple processors 20 typically connected by a local area network 10. Each of the multiple processors 20a-20n typically has its own private non-volatile storage 30a-30n and its own private memory 40a-40n. One problem with a Shared Nothing architecture in which information is distributed over multiple nodes is that it typically cannot operate very well if any of the nodes fails because then some of the distributed information is not available anymore. Transactions which need to access data at a failed node cannot proceed. If database relations are partitioned across all nodes, almost no transaction can proceed when a node has failed.

The likelihood of a node failure increases with the number of nodes. Furthermore, there are a number of different types of failures which can result in failure of a single node. For example:

(a) A processor could fail at a node;
(b) A non-volatile storage device or controller for such a device could fail at a node;
(c) A software crash could occur at a node; or
(d) A communication failure could occur resulting in all other nodes losing communication with a node.

In order to provide high availability (i.e., continued operation) even in the presence of a node failure, information is commonly replicated at more than one node, so that in the event of a failure of a node, the information stored at that failed node can be obtained instead at another node which has not failed. The multiple copies of information are usually called replicas, one of which is usually considered the primary replica and the one or more other copies considered the secondary replica(s).

The maintenance of replicas always involves an added workload for the computer system. This invention specifically relates to the problem of maintaining replicas in a more efficient manner.

DESCRIPTION OF THE PRIOR ART

A general review of storage media recovery techniques has been published by G. Copeland and T. Keller in "A Comparison of High-Availability Media Recovery Techniques," Proceedings of the ACM-SIGMOD International Conference on Management of Data, Portland, Oreg., June 1989.

The Shared Nothing architecture is described by M. Stonebraker in "The Case For Shared Nothing," Database Engineering, Vol. 9, No. 1, 1986.

Prior art generally relating to recovery from failures in single site database system is surveyed by T. Haerder and A. Reuter in "Principles of Transaction-Oriented Database Recovery", ACM Computing Surveys, September. 1983.

One type of recovery method, which relies upon the creation of a log of changes to database pages, is called Write-Ahead Logging. A Write-Ahead Logging method that has been named ARIES is described by C. Mohan, D. Haderle B. Lindsay, II. Pirahesh, and P. Schwarz in "ARIES: A Transaction Recovery Method Supporting Fine-Granularity Locking and Partial Rollbacks Using Write-Ahead Logging", RJ 6649, IBM Almaden Research Center, San Jose, Calif., January 1989. ARIES is also described by C. Mohan, D. Haderle, B. Lindsay, II. Pirahesh, and P. Schwarz in U.S. patent application Ser. No. 59,666 filed on Jun. 8, 1987 and entitled "Method for Managing Sub-page Concurrency Control and Partial Transaction Rollback in a Transaction-Oriented System of the Write-Ahead Logging Type". Since the recovery method in the preferred embodiment of the present invention is based upon the ARIES method of recovery, these two ARIES references are hereby fully incorporated by reference.

Replica control protocols are described, for example, in U.S. Pat. Nos. 4,007,450, 4,432,057, 4,714,992 and 4,714,996. However, this invention is directed instead towards the problem of keeping secondary replicas up-to-date and not with replica control. The replica control method used in accordance with the preferred embodiment of this invention is the primary copy access scheme described, for example, by P. A. Bernstein, V. Hadzilacos, and N. Goodman in "Concurrency Control and Recovery in Database Systems," Addison Wesley, 1987.

The usual prior art approach for maintaining replicas is to maintain the secondary replicas always up-to-date with respect to the primary. Two distinct mechanisms have been proposed for such "synchronous" updating of secondary replicas—at the physical level and at the logical level.

In physical replication, the bits stored on disk of the primary are copied onto a secondary disk, and there are no semantics associated with the bits. In contrast, logical replication attempts to take advantage of database semantics by duplicating the database state at the secondary replica.

Physical level replica maintenance is typified by Tandem's NonStop SQL as described, for example, by the Tandem Database Group in "NonStop SQL, A Distributed, High-Performance, High-Reliability Implementation of SQL," Workshop on High Performance Transaction Systems, Asilomar, Calif., September 1987, and by various extensions to RAID) (described by D. Patterson, G. Gibson and R. Katz in "A Case For Redundant Arrays of Inexpensive Disks (RAID))," Proceedings of the ACM-SIGMOD) International Conference on Management of Data, Chicago, May 1988), for example RADD (described by M. Stonebraker and G. Schloss in "Distributed RAID)—A New Multiple Copy Algorithm," Proceedings of the 6th International Conference on Data Engineering, Los Angeles, February 1990). Tandem achieves this by using dual-ported mirrored disks to achieve high availability, but requires special purpose hardware. RADD suffers from excessive communication overhead, since every write becomes a distributed write.

Synchronous updates based on logical replication are exemplified by the Teradata DBC/1012 ("DBC/1012 Database Computer System Manual Release 2.0," Document No. C10-0001-02, Teradata Corp., November 1985) and by the GAMMA database machine, which is described by D. DeWitt, S. Ghandeharizadeh, D. Schneider, A. Bricker, II. Ilsiao, and R. Rasmussen in "The Gamma Database Machine Project," IEEE Transactions on Knowledge and Data Engineering, Vol. 2, No. 1, pp 44–62, March 1990. In Teradata's database machine, a transaction is run concurrently on the two replicas, which incurs significant CPU and I/O overhead in comparison to running a transaction only one time. For the GAMMA machine it has been proposed to send dirty pages to the secondary replica at transaction commit time (See "Performance and Availability In Database Machines With Replicated Data" by Hui-I Hsiao, Computer Sciences Technical Report #963, University of Wisconsin, August 1990), which incurs significant communication overhead at both primary and secondary replicas and possibly large I/O overhead at the secondary replica for hot pages. In addition, it results in a worsened response time during normal operation.

Another approach has been to update the secondary replicas independently (and generally later) than the primary replica. The advantage of such an "asynchronous" update is that it imposes lesser overhead during failure free operation. Proposals using this mechanism have all sent the log entries to the secondary replicas before committing a transaction. The log entries then are used at the secondary replicas to make the same modifications to the secondary replicas as were made to the primary replica when the log was produced. Such an asynchronous update is described by R. King, II. Garcia-Molina, N. Halim, and C Polyzois in "Management of A Remote Backup Copy for Disaster Recovery," University of Princeton CS-TR-198-88 and by C. Mohan, K. Treiber, and R. Obermarck in "Algorithms For the Management of Remote Backup Data Bases for Disaster Recovery," IBM Research Report, July 1990.

SUMMARY OF THE INVENTION

It is an object of this invention to more efficiently provide failure safety and high availability in Shared Nothing architectures.

It is another object of this invention to more efficiently maintain replicas in a transaction-oriented partitioned database system.

A further object is to more efficiently maintain replicas on separate processing systems using a Write-Ahead Log based protocol.

It is also an object to maintain replicas without requiring special purpose hardware.

Another object is to maintain replicas on separate processing systems while minimizing the workload thereby added to both system.

Still another object is to maintain replicas on separate processing systems without thereby causing any delays in either such system.

A further object is to update replica on separate processing systems without restricting the updates to take place before or at the transaction commit time.

It is also an object to maintain a secondary replica on a separate system than the corresponding primary replica while minimizing required disk accesses and required processing at the secondary replica.

A still further object is to provide more efficient recovery of a partitioned database system of the Shared Nothing type which maintains replicas when a replica becomes unavailable.

Another object is to minimize the impact of maintaining replicas in a Shared Nothing architecture though advantageous use of a high bandwidth interconnection system.

These and further objects are achieved in accordance with this invention by maintaining one or more secondary replicas by spooling (i.e., asynchronously sending) modified (usually called dirty) pages From the primary replica to the secondary replica(s) rather than by using a synchronous update or by sending log entries instead of entire pages. A Write-Ahead Log protocol is used, which means that a dirty page is not forced to non-volatile storage until a log record of the modification is created and written to non-volatile storage. Since dirty pages are sent from the primary replica to the secondary replica(s), disk accesses and processing at the secondary replica(s) arising from the maintaining of the replicas are minimized.

Furthermore, since log entries are not needed to maintain the replicas during failure free operation, in the preferred embodiment only one centrally accessible log is maintained for all replicas of the same partition. The central log may be hardened against failure in any way, including the use of a backup.

The primary replica maintains a dirty page table which identifies not only the dirty pages which have not been stored yet in its own non-volatile storage but also for each of the secondary replicas (if there is more than one) identifies the dirty pages which have not yet been sent to the secondary replica and acknowledged by the secondary replica as stored in its non-volatile storage.

If a Failure occurs with respect to the primary replica, the secondary replica (or one of them if more than one is being maintained) is brought up to date using the log and it then takes over the role of the primary replica.

When a failed system recovers from the failure, the replica(s) it maintains must be brought up to date. This may be done from the corresponding primary replica by sending dirty pages to the recovering system (assuming the corresponding primary replica is available and has maintained the needed dirty page table entries). Recovery may be done alternatively from the log in the event the corresponding primary replica is not available or has not maintained the needed dirty page table entries or because recovery from the log is preferred.

In order to keep track of the various replicas, a node manager service is also provided which co-ordinates the recovery and ensures that transactions are correctly routed to the primary replica.

BRIEF DESCRIPTION OF THE DRAWINGS

FIG. 3 shows the Shared Nothing architecture using a hardened log server.

FIG. 4 shows the dirty page table structure for ARIES.

FIG. 5 shows the transaction table used in ARIES.

FIG. 6 shows the dirty page table structures used in this invention.

FIG. 7 shows the table maintained by the node manager.

DESCRIPTION OF THE PREFERRED EMBODIMENT

The invention is preferably used in connection with a partitioned database system and will be described now in further detail in that environment.

Maintaining replicas always involves additional workload for a computer system. For each data partition in a partitioned database system which maintains replicas, there is one primary replica against which update transactions run. There is at least one and may be a number of secondary replicas of each partition, which are updated in accordance with this invention by sending dirty pages over to the one or more secondary replicas.

Figure 1:
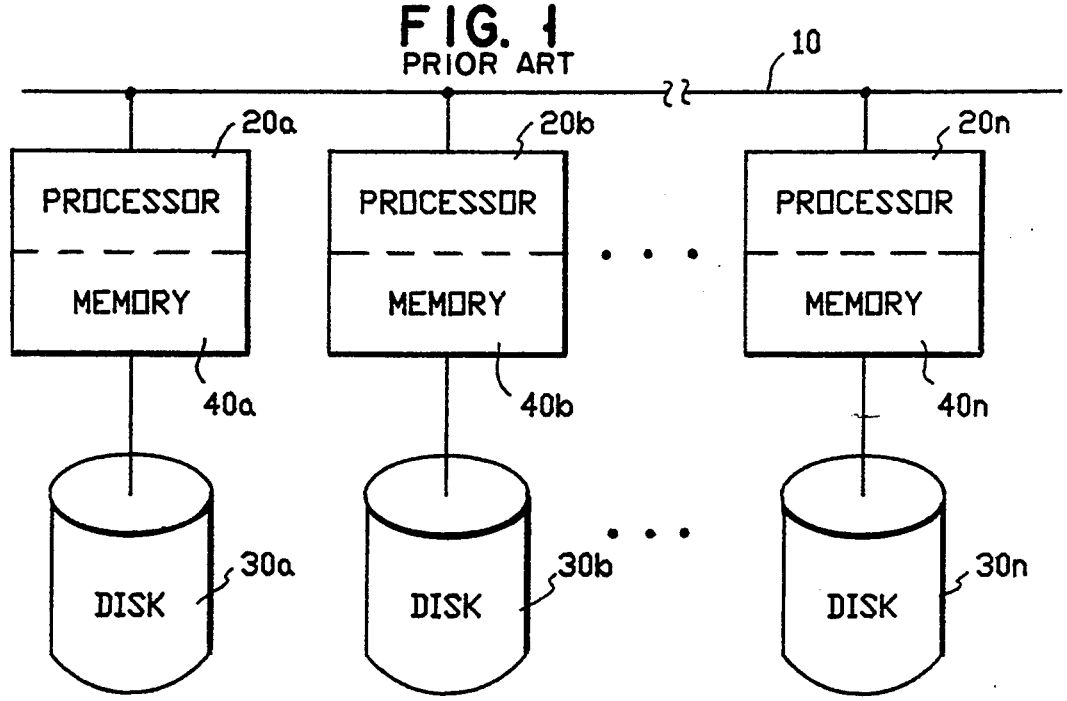
FIG. 1 shows the organization of a Shared Nothing architecture.
Figure 2:
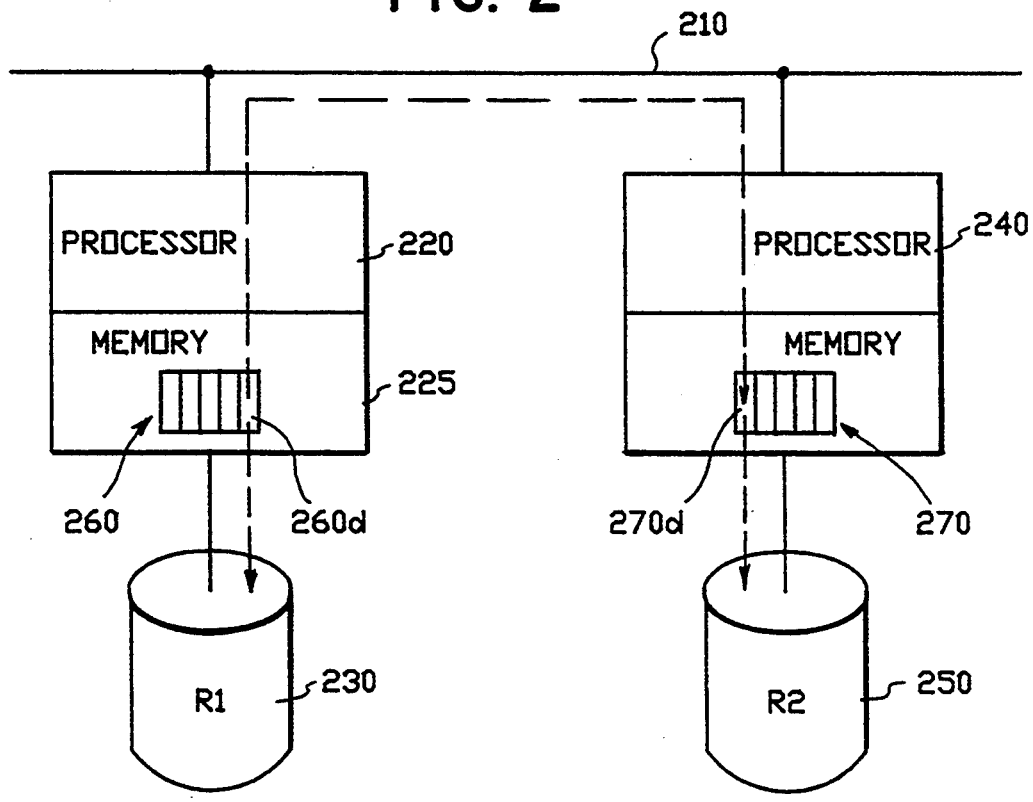
FIG. 2 shows the information flow between a primary and a secondary replica.

FIG. 2 illustrates a portion of a partitioned database in which there are two replicas, R1 and R2, for one of the partitions. Assume that transactions are directed to R1 (i.e. R1 is the current primary replica of the illustrated partition) permanently stored on disk 230. Transactions running in processor 220 use pages 260 in volatile memory 225. These pages 225 were originally obtained from the permanent copy of replica R1 on disk 230.

A page brought (i.e., copied) from disk R1 to memory 225 is considered "dirty"0 when it gets modified by processor 220 because it is then not the same anymore as the copy of that page stored on disk 230. When a page 260 gets modified, a log record of the modification is made and sometime after the log record for an updated page 260 has been written, the modified page can be written by processor 220 to replica R1's disk 230. Many modifications can be made to the page before it is pushed out (i.e., copied) to disk 230.

In accordance with this invention, at some time after the log record is written, the dirty page (identified by reference number 260d in FIG. 2) is spooled over to processor 240, which is handling replica R2. Dirty pages can be sent one at a time or as a stream of dirty pages (SDP) that flow over the communication network 210 from processor 220 to processor 240. It would be preferable for the sake of performance to spool a dirty page to the secondary replica before it is thrown out of the primary's volatile memory. However, this is not strictly required. In order to minimize the spooling overhead, we prefer to send the dirty page to the secondary when it is pushed out of volatile memory onto the non-volatile permanent storage.

When replica R2's processor receives the copy 270d of dirty page 260d, it will force the dirty page to its local disk 250 either immediately or at some later time, and then send back an acknowledgment to processor 220. The broken lines in FIG. 2 illustrate the flows of a page which becomes dirty in memory 225.

Writes to disk at any replica must follow the Write-Ahead Log protocol, i.e. a dirty page must not be written to disk until the log record describing that dirty page is written out to stable storage. Other than this condition, the invention provides for complete asynchrony between the writes at the various replicas.

Because transactions are running against the data stored at the primary replica only, there is very little runtime overhead at the other replicas. And because transactions can commit without waiting for corresponding dirty pages to be written at secondary replicas, there is little or no response time delay.

Log data is stored on stable storage such that it remains accessible to any replica after any single failure. For this, the simplest arrangement is a hardened log server, as shown in FIG. 3. In such a scheme, a typical node 310 sends its log stream 330 over the local area network 340 to a hardened log server 320 that can survive single failures. Furthermore, a log record is written to the server before its corresponding page is sent to the disk 315 in order to satisfy the write-ahead log protocol.

If a failure occurs on the primary replica, the secondary replica is brought up-to-date with the primary replica using the log obtained from the server. It then takes over the role of the primary and transactions are now run against it. Since the secondary has to recover from the log, the log reflects the stable storage state of the primary as well as of all the secondaries. This makes the log symmetrical with respect to the primary and all the secondaries so that at any time any of the replicas can recover from the log.

If a failure occurs in a secondary replica, operations continued uninterrupted. When the failed secondary comes back up, it partially recovers using the log, and then starts accepting a stream of dirty pages (SDP) from the primary.

The following details of a preferred implementation of this invention now will be described:

(a) the changes needed to the write-ahead logging method known as ARIES (which is our preferred logging method) in order to keep track of two replicas rather than a single copy;

(b) the actions taken by the primary during failure-free operation to keep the secondary replica up-to-date;

(c) system and node management actions, performed by a node manager, which include detection of failure, assignment of primary and secondary roles and switching of these roles (The node manager must take consistent actions in the face of lost messages, network partitions and other errors); and (d) how recovery is achieved in a number of failure scenarios.

Before describing these functions in detail, the salient relevant features of ARIES will be described. ARIES is described in more detail in the two references cited earlier.

ARIES Write-Ahead Logging Method

ARIES maintains a dirty page table (DPT) (FIG. 4) for all pages that have not yet been pushed to the disk. This DPT contains two fields for each page that is dirty and in-memory: the page-id field 420, and the RecLSN field 430 (for Recovery Log Sequence Number, which is the address of the next log record to be written when the page was first modified). Whenever a non-dirty page is updated in memory, a row 440 is added to the DPT with the corresponding Page-Id and the next LSN to be assigned (i.e., RecLSN). The RecLSN ind position in the log from which an examination must begin to discover the log record that describes the changes made to this page. Whenever a page is written to the disk, the corresponding entry in the DPT is deleted. Furthermore, at a checkpoint (CP), the current DPT is written to the CP log record.

When the database system is recovering from a crash, it goes through the log from the last checkpoint record (which contains the DPT at the time of the checkpoint) to the end, and reconstructs the DPT. In addition, it determines winner and in-flight transactions. This scan is called analysis phase.

In accordance with the ARIES procedure, the log is then examined in the forward direction (starting at a position which is called the Minimum RecLSN, which is the minimum RecLSN of the entries in the reconstructed DPT, and indicates the earliest change in the database that was potentially not written to the disk), to uncover all redoable actions. For each redoable action for a page that was potentially dirty at the time of the crash and which passes certain criteria, ARIES redoes the action.

Finally, in the third pass, ARIES proceeds backwards from the end of the log, undoing all in-flight transactions, i.e. transactions that were in progress at the time of the crash. FIG. 5 shows the transaction table used by ARIES. In this table, there is a row 560 for each transaction, containing its transaction identifier 520, state (committed, aborted or in-flight) 530, last log record written 540, and the last log record that has not yet been undone 550.

The four aspects will now be described that were identified above (namely, changes to the ARIES log, normal operations, the node manager, and recovery). For the purpose of this description, we will focus on a particular database partition that has two replicas: R1 and R2. Anyone of ordinary skill would be able to extend this easily to a system having more than two replicas for each partition. One of the two replicas plays the role of the primary (P) and the other the role of the secondary (S) for this partition.

Design of the Unified Log

ARIES records information about which pages are in volatile storage (main memory) only in its checkpoint log records. All other log records are independent of the main memory state (or disk state). Since the disk states of the two replicas R1 and R2 will in general be different, the ARIES checkpoint must be modified to reflect this. All other log records will apply equally well to both R1 and R2.

The primary P maintains more information in its DPT than when only one replica is present in a system. Effectively two DPTs are maintained—a DPTR1 and a DPTR2 (FIG. 6). It should be apparent that the two DPT's maintained by P can be unified in various ways to more compactly store the same information. For Ri (i=1,2), the DPTs maintained by P contain a row 640, 680 for each page that is potentially dirty and not yet on Ri's disk. For pages that have just been updated on P, an entry will exist in both DPT's. However, for pages that have been forced to P's disk and not yet to S's disk, there will be an entry only in the DPT of Rk where Rk is playing the role of S.

Thus, whenever a clean page is brought into the memory of P for updating, an entry is added to both of the DPTs with the current RecLSN value. When a page is to be forced to P's disk, it is simultaneously spooled to S's disk if it has not yet been done. Whenever the disk write completes at Ri (i=1,2) and P receives the acknowledgment of the same, the corresponding entry in DPTRi can be deleted.

After a disk write for a page is started at P and the page is shipped to S, the page might need to be updated again at P. This results in two entries for the same page in the DPT of each replica for which the disk write is not yet complete. This is more likely for S since there is a round-trip message delay in addition to the disk write latency. As a consequence, the acknowledgments from S (and local disk writes) should not only reflect the PageId, but also the RecLSN number of the received page, so that P can delete the appropriate entry in DPTRi. Finally, the recovery procedure must use the entry with the smallest RecLSN for recovery purposes.

If a current S is down, in effect, acknowledgements from S for disk writes are never received at P. Thus, if one were prepared to write increasingly larger DPTRk (if Rk is playing the role of S), then no changes need to be made to the procedure. Let us define SDownCP to be the checkpoint immediately preceding the time when S went down. Then, an effective way to bound the size of the DPT for the secondary is for P to write a pointer to SDownCP in place of the DPT For the secondary in all subsequent CP's. In effect, P behaves as if it is the only replica, and hence writes only its own DPT. When S recovers after being down, it starts the analysis phase of ARIES from SDownCP. If desired, a CP can be taken immediately when S goes down, and this CP will become SDownCP.

Failure-Free Operation

Database operations are executed only on the primary replica. In order to keep replicas P and S reasonably synchronized with respect to the database state, updated pages are sent to S at some time before they are discarded from P's buffer. There are a number of policies possible for doing this. They involve different trade-offs between recovery time and CPU, disk and network overheads during failure-free processing depending on how soon after update (i.e., dirty) pages are sent to S. The only criterion needed for correctness is that the Write-Ahead log protocol be used, i.e. an updated page be sent to S only after the log record describing the update is written to the log. The set of updated pages is termed SDP, for Stream of Dirty Pages. Furthermore, S acknowledges to P when it writes dirty pages to its disk (it may buffer pages in its own memory for faster recovery).

Meanwhile, all log records are written to a log server. The log represents the disk state of both the primary and the secondary in a unified fashion, enabling either replica to recover to the latest transaction consistent state when required.

The primary carries out the following procedure (described in Pseudo-Code) to update the secondary replica:

```
For each dirty page in buffer
{
  if (S is up)
  {
    Send page to S after latest log record modifying
      the page is written out and before the page is
      expelled from the buffer.
    After receiving acknowledgement from S that page is on
      disk delete entry for page from DPT for S.
  }
  else
    /* Do nothing, i.e. P behaves as if it is the only replica */
}
At checkpoint time do:
  if (S is up)
  {
    write DPT of both P and S in checkpoint.
    inform S that a checkpoint has taken place.
    /* For S to reset the "Received List" described later
  }
  else
``` write DPT of P and a pointer to the latest SDownCP.

The Node Manager

A mechanism is required in accordance with this invention to ensure that inconsistent actions do not take place as a consequence of network partitions, lost messages or other errors. For example, two nodes which both have copies of a given partition should not both decide to take over the primary role. We call this the node manager function.

This mechanism is best implemented at the log server node since it can enforce its view of the system state by not allowing the "wrong" node to write log records. A node which cannot write log records cannot commit any transaction and hence can do no harm. In our preferred scheme, the node manager keeps track of the state of each partition. If a primary fails, it asks the secondary to take over the role of primary after recovering its database state. If a secondary fails, it asks the primary to record SDownCP.

The node manager is informed by every node when it recovers after a failure. Based on a state table that the node manager keeps for every partition, it sends this node a message asking it to recover. The state table records the information shown in FIG. 7 for each partition, which includes the following fields:

R1 720, which identifies the location of the first replica;

R2 730, which identifies the location of the second replica;

P760, which identifies the current primary node (one of R1 or R2) and therefore also identifies the current secondary node S as the node different from P;

StateR1 740, which records whether the replica R1 is up or down;

StateR2 750, which records whether the replica R2 is up or down;

Recovery

A node (say R1) is asked to recover in one of the following two scenarios:

(1) It comes back up after a failure:

It first informs the node manager, which then decides the role assignment for R1. If it happens to be the secondary, then the node manager asks the corresponding primary to log an SUp record. The node manager then asks R1 to recover, either till SUp, or till the end of the log.

(2) It is asked to take over the role of the primary:

In this case, the node manager asks it to catch up and recover to the end of the log.

The actions taken by R1 during recovery are described in Pseudo-Code as follows, which should be self-explanatory:

```
Request last checkpoint from log server.
  if (checkpoint has DPT for R1)
  {
     Start ARIES analysis pass from this DPT.
     Delete pages from this DPT which
     occur in "Received Last".
  }
  else
  {
     Follow pointer to SDownCP.
     Start ARIES analysis pass from this point and
     reconstruct (conservative) DPT before failure.
  }
  Perform REDO and UNDO ARIES passes and complete
  recovery.
```

The "Received List" is a list of pages S received from the primary after the last checkpoint. This list is reset to zero after S receives the information that P has taken a checkpoint. If S is taking over, then after finishing the analysis pass, pages in this list should be deleted from the reconstructed DPT. This helps reduce the size of the DPT by eliminating those pages that occur in the DPT, but have been received since the last CP.

When a primary fails, and a secondary is recovering, it must read pages in the DPT from disk to apply log records to it during the redo and undo phases of ARIES. The disk I/O would not have to be performed if the secondary buffered hot and often updated pages in main memory. The secondary can get hints from the primary about which pages are good candidates for such buffering. The primary could keep information about how long each page has been in its buffer and thus provide such hints.

While the invention has been particularly shown and described with reference to a preferred embodiment thereof; it will be understood by those skilled in the art that various changes in form and detail may be made without departing from the spirit and scope of the invention.

Having thus described our invention what we claim as new and desire to secure as Letters Patent, is:

1. An improved transaction processing system of the type which includes:

a plurality of transaction processors connected by a communication network, each of said processors having its own private storage;

said transaction processing system having at least one partition of data which is subpartitioned into pages, said partition of data including a primary replica of said partition and a secondary replica of said partition, said primary replica being stored in said private storage of one of said processors and said secondary replica being stored in said private storage of another one of said processors; and a non-volatile log, said transaction processing system using a Write-Ahead Log protocol in which a modification to a page in said partition is not considered made until said modification is stored in said log; wherein the improvement comprises:

means for generating a response indicating to a transaction requestor that a requested transaction on the primary replica has completed;

means for updating said secondary replica from said primary replica by asynchronously sending modified pages from said primary replica to said secondary replica independently of the generation of the response by the means for generating and without imposing any page sending order or timing constraint;

means for keeping track of the pages of said partition which have been modified in said primary replica and not yet modified in said secondary replica; and means for making said log accessible to both said processors which are storing a replica of said partition, whereby said secondary replica is maintained without imposing delay upon the processing of transactions on said primary replica by said one processor.

2. A transaction processing system as defined in claim 1 wherein said transaction processing system has a plurality of partitions of data, each of said plurality of partitions of data including a primary replica and at least one secondary replica, each of said replicas of a same partition being stored in different ones of said private storages.

3. A transaction processing system as defined in claim 2 wherein said partitions of data form a distributed database of the Shared Nothing type.

4. A transaction processing system as defined in claim 2 and further comprising a node manager for identifying the particular processor which is deemed to have said primary replica of any particular partition in its private storage and for identifying each particular processor which has one of said at least one secondary replica of said particular partition in its private storage.

5. A transaction processing system as defined in claim 4 wherein said node manager tracks the operational status of each of said replicas and in the event of failure of the primary replica of any partition identifies a non-failed secondary replica of said any partition as the primary replica.

6. A transaction processing system as defined in claim 2 wherein transactions are completed only against the particular replica of any partition which is identified by said node manager as the primary replica.

7. A transaction processing system as defined in claim 2 wherein any one replica of any one or more partitions can fail without thereby causing said transaction processing system to fail.

8. A transaction processing system as defined in claim 7 wherein a failed replica can be restored from said log.

9. A transaction processing system as defined in claim 7 wherein a failed replica of a partition can be restored from another replica of said partition.

10. A transaction processing system as defined in claim 1 wherein each of said private storages includes a non-volatile portion and a volatile portion, said replica of a partition stored in each of said private storages being permanently stored in said non-volatile portion thereof, individual pages of said primary replica being fetched to said volatile portion of said private storage of said one processor for use, at least some of said fetched pages becoming modified and being forced back to said non-volatile portion of said private storage of said one processor.

11. A transaction processing system as defined in claim 10 wherein said means for updating includes means for sending a modified page of said primary replica from said volatile private storage portion of said one processor to said volatile private storage portion of said another processor for transfer into said non-volatile storage portion of said another processor.

12. A transaction processing system as defined in claim 11 wherein said means for updating further comprises means for acknowledging to said one processor that a modified page of said primary replica sent from said volatile private storage portion of said one processor has been stored in said non-volatile storage portion of said another processor.

13. A transaction processing system as defined in claim 11 wherein said modified page is transferred into said non-volatile storage portion of said another processor before said modified page is forced back to said non-volatile private storage portion of said one processor.

14. A transaction processing system as defined in claim 11 wherein said modified page is sent to said private storage of said another processor when said modified page is forced back to said non-volatile private storage portion of said one processor.

15. A transaction processing system as defined in claim 11 wherein said means for keeping track includes table means for identifying pages of said partition that have been modified and not yet stored in said non-volatile private storage portion of said another processor.

16. A transaction processing system as defined in claim 15 wherein said table means includes a first dirty page table for identifying modified pages of said partition that have not yet been stored in said non-volatile private storage portion of said one processor and a second dirty page table for identifying modified pages of said partition that have not yet been stored in said non-volatile private storage portion of said another processor.

17. A transaction processing system as defined in claim 1 wherein said log is stored in a log server.

18. A transaction processing system as defined in claim 17 wherein said means for making said log accessible includes means connecting said log server to said transaction processors.

19. A transaction processing system as defined in claim 18 wherein said means for making said log accessible includes means connecting said log server to said communication system.

20. A transaction processing system as defined in claim 1 wherein said primary replica can be updated by multiple transactions asynchronously with the updating of the secondary replica.

21. A transaction processing system as defined in claim 1 wherein said private storage of said one processor includes volatile private storage and non-volatile private storage and said means for updating includes means for sending a modified page to said private storage of said another processor in response to said modified page being sent from said volatile private storage of said one processor to said non-volatile private storage of said one processor.

* * * * *